Patented May 20, 1952

2,597,660

UNITED STATES PATENT OFFICE 2,597,660

ZINC SULFIDE TYPE PHOSPHORS

Alfred H. McKeag and Peter W. Ranby, North Wembley, England, assignors to General Electric Company, a corporation of New York No Drawing. Application March 15, 1950, Serial No. 149,888. In Great Britain December 8, 1947

12 Claims. (Cl. 252—301.6)

This invention relates to luminescent materials, one of its objects being to provide luminescent materials of novel composition which are suitable for use in fluorescent lamps or cathode ray tube screens or X-ray screens, or for two or more of these uses. The invention also relates to a method of manufacturing such luminescent materials, and to combinations of such luminescent materials with electrical means for exciting them to luminescence, for example, electric discharge lamps and cathode ray tubes. This application is a continuation-in-part of our application Serial No. 126,243, filed November 8, 1949, now abandoned, which is, in turn, a continuation-in-part of our application Serial No. 59,418, filed November 10, 1948, now abandoned.

In general, luminescent materials of different composition differ also in the color or efficiency of their luminescence or in the radiations by which they are excited to luminescence, or in two or more of these properties. It may be observed, however, that a material of a new composition might be useful even if it resembled known materials very closely in all these properties.

It is well known to provide a mixture of two or more materials having suitable different colors of luminescence, the materials being in such proportion that the color of luminescence of the mixture is substantially white. It will be seen that some of the luminescent materials provided by this invention give by themselves an approximately white luminescence under suitable excitation, and some of these materials are particularly suitable for use in the manufacture of fluorescent screens for cathode ray tubes where a white fluorescence is often desirable, for example, for television purposes.

According to one aspect of the invention a luminescent material comprises zinc sulphide activated by phosphorus. According to another aspect of the invention the luminescent material may be modified by replacing part of the sulphur in the zinc sulphide with selenium and/or tellurium to form phosphorus-activated zinc-selenium-sulphide, zinc-tellurium-sulphide, or zinc-selenium-tellurium-sulphide.

According to another aspect of the invention a luminescent material capable of being excited by ultraviolet radiation of wavelength 3650 Å. to fluorescence of a bluish-white, white, yellow-white or yellow color consists of crystals containing the elements zinc, sulphur, and phosphorus with or without selenium and/or tellurium.

According to a further aspect of the invention, a method of manufacturing a luminescent material comprises heating, in a reducing or neutral atmosphere, i. e., a nonoxidizing atmosphere, a material or mixture containing zinc, sulphur and phosphorus with or without selenium and/or tellurium and consisting of one or more of these elements and/or one or more compounds of these elements.

The luminescent materials according to the invention may be excited to luminescence by ultraviolet radiation of long or short wavelength or by cathode rays or by X-rays, or by two or more of these agents, the color and intensity of the luminescence varying somewhat with different exciting agents.

The preferred method of manufacturing a phosphorus-activated zinc sulphide luminescent material in accordance with the invention comprises heating zinc sulphide together with an amount of phosphorus or of one or more compounds of phosphorus such that the weight of phosphorus present does not exceed 5 per cent of the weight of the zinc sulphide, the heating being carried out at an elevated temperature, preferably within the approximate range of 900–1100° C. (although higher or lower temperatures may in some cases be used, say 700 and 1200° C.), and in a reducing atmosphere.

This method is preferably carried out by heating, in a suitable reducing atmosphere, an intimate mixture of finely divided zinc sulphide with either red phosphorus or one or more compounds of phosphorus, also in a finely divided state. Compounds of phosphorus which are suitable for use include, for example, phosphides (the preferred member of this group being zinc phosphide, $Zn_3P_2$), phosphorus pentasulphide, $P_2S_5$, and oxysalts, especially phosphates such as the phosphates of zinc, sodium, calcium and ammonium.

Preferably the reducing atmosphere, in which the heating is carried out, consists of hydrogen, but we have found that carbon monoxide is also a suitable atmosphere in some cases. The atmosphere may be made strongly reducing, for instance by providing a continuous flow of hydrogen over the heated material; or the reducing action may be made of medium intensity, for example by providing a static atmosphere of hydrogen in contact with the heated material; or a weakly reducing atmosphere may be provided, for example by decomposition of a limited amount of an ammonium salt during the heating. Preferably, the atmosphere employed is substantially dry.

In our experience we have not found it desirable to have the proportion of phosphorus incorporated as activator into the zinc sulphide by this method higher than 5 per cent by weight, and it appears that preferably it should not exceed 3 per cent of the weight of the zinc sulphide, since proportions of phosphorus higher than 5 per cent may result in a diminution in the brightness of the luminescence. Very much smaller proportions of phosphorus, down to 0.1 per cent or less, for example 0.02 per cent, are effective in activating zinc sulphide. The color of the luminescence of the resulting material under excitation by any given radiation depends upon the phosphorus content. For example, a material containing 0.1 per cent of phosphorus, introduced by heating zinc sulphide with zinc phosphide in hydrogen at 950° C., exhibited fluorescence of a bright yellow-white color under excitation by ultraviolet radiation of wavelength 3650 Å., while material containing 0.5 per cent of phosphorus, similarly introduced, showed a deep yellow fluorescence under the same excitation.

It is believed that only the phosphorus present in a reduced form after the heating is effective as an activator, and that where any phosphorus present after heating is in a high state of oxidation (for example where it is present in the form of phosphates), it is substantially inert in this respect; the presence of such compounds in high proportion after heating is in general undesirable, since they act merely as diluents, and if colored are additionally objectionable. It follows that the color of the luminescence of the material produced by this method depends to some extent on the nature of the atmosphere in which the heating takes place, particularly if a phosphate is employed as the source of phosphorus, since the reducing power of the atmosphere will determine what proportion of the phosphorus is present in the reduced state (and therefore effective to produce activation) and what proportion is present in the non-reduced state. In general, the more strongly reducing the atmosphere, the more saturated is the color of the luminescence for a given phosphorus content.

The zinc sulphide employed in the manufacture of the luminescent material of the invention should be of the highest purity obtainable, and must be sufficiently free from metallic impurities such as iron, cobalt, nickel, copper, etc. to avoid such impurities inhibiting the luminescence or producing a different activation of the zinc sulphide. The zinc sulphide is preferably prepared by precipitation and careful washing. The phosphorus or phosphorus compound or compounds used should also be of a high degree of purity.

Fluxes such as are employed in the manufacture of known zinc sulphide luminescent materials may be used if desired; their use is not essential, but has been found to improve the brightness of the luminescence of the products. Chlorides, particularly those of metals of the alkali and alkaline earth groups, are generally used as fluxes. For example, a mixture of zinc sulphide with 10 per cent of its weight of magnesium chloride and 3 per cent of its weight of sodium chloride forms a suitable starting material to which phosphorus is added in accordance with the invention.

Some specific examples of methods of manufacturing luminescent materials in a reducing atmosphere will now be given. In each of the following examples the stated color of luminescence is (in the absence of a statement to the contrary) that of the fluorescence produced under excitation by ultraviolet radiation of wavelength 3650 Å.

Example I 50 grams of precipitated zinc sulphide are mixed into a paste with 10 ml. of a 50 per cent aqueous solution of magnesium chloride and 5 ml. of a 30 per cent aqueous solution of sodium chloride, the paste is dried at 160° C., and the dry material is ground to a fine powder.

The material thus prepared is ground with 0.1 gram of diammonium hydrogen phosphate, and this mixture is heated in a furnace for one hour at 950° C. in a slow stream of hydrogen. The product is allowed to cool in an atmosphere of hydrogen, and when cold is washed free from fluxes, dried and sieved to give a fine powder ready for use in forming a fluorescent coating or screen.

The powder exhibits a yellow fluorescence under excitation by ultraviolet radiation of 3650 Å., and a substantially white fluorescence under excitation by cathode rays.

Example II 50 grams of precipitated zinc sulphide are mixed into a paste with 10 ml. of a 50 per cent magnesium chloride solution and 5 ml. of a 30 per cent sodium chloride solution, and the paste is dried at 160° C.

The dried material is ground with 0.9 gram of sodium pyrophosphate, and the mixture is heated in a furnace for one hour at 950° C. in a slow stream of hydrogen. The product is allowed to cool in hydrogen, and when cold is washed, dried and sieved.

The resulting powder exhibits a yellow-white fluorescence.

Example III

The method is carried out as described in Example II, with the modification that 5 grams of sodium pyrophosphate are used.

The product shows a deep yellow fluorescence.

Example IV

The method is carried out as described in Example II, but the sodium pyrophosphate is replaced by various other phosphorus-containing materials. The following table gives some examples of such other materials used, with the weight of the material used and the color of fluorescence of the product.

| Substance replacing sodium pyrophosphate | Weight used in grams | Fluorescence of resulting material |
|---|---|---|
| Red phosphorus | 0.12 | Light yellow. |
| Zinc phosphide | 0.5 | Yellowish-white. |
| Zinc phosphate | 0.3 | Creamy-yellow. |
| Diammonium hydrogen phosphate | 0.5 | Do. |
| Calcium hydrogen phosphate | 0.5 | White. |

Example V

Precipitated zinc sulphide is heated in a closed boat for half an hour at 1000° C. When cool, the zinc sulphide is ground and mixed with one per cent of its weight of zinc phosphide, and the mixture is furnaced in a static atmosphere of hydrogen at 1100° C. for half an hour, and then allowed to cool in hydrogen.

The product is washed, dried and sieved, and the powder thus obtained exhibits a pale yellow fluorescence.

Example VI

A mixture consisting of precipitated zinc sulphide, 5 per cent by weight of diammonium hydrogen phosphate and one per cent by weight of zinc hydrogen phosphate is heated in a boat, the end of which is closed with a glass wool plug, at 900° C. for one hour. The product is allowed to cool before air is freely admitted to the boat, and is then washed, dried and sieved.

The powder thus obtained shows a bluish-white fluorescence.

The above examples illustrate the use of atmospheres of varying reducing power. Thus, in Examples I, II, III and IV the atmosphere is strongly reducing; in Example V it is of a moderately reducing nature; while in Example VI it is only weakly reducing since it is produced merely by the decomposition of diammonium hydrogen phosphate during the heating.

As an alternative to the above-described methods involving heating in a reducing atmosphere, the phosphorus-activated zinc sulphide luminescent material may be made by methods which comprise heating zinc sulphide together with up to 10 per cent of its weight of elementary phosphorus or a compound of phosphorus, to an elevated temperature, preferably between about 900° C. and 1100° C., in a neutral atmosphere, i. e., one which has substantially neither oxidizing nor reducing properties in respect of the substances being heated.

Suitable atmospheres for use in this method are, for example, nitrogen and sulphur vapor. The gas or vapor employed is preferably dried before being introduced into the reaction vessel.

If elementary phosphorus is employed, the process may be carried out either by heating an intimate mixture of finely divided red phosphorus and finely divided zinc sulphide in the required proportions, or by heating finely divided zinc sulphide in contact with phosphorus vapor. Alternatively, the phosphorus may be added to the zinc sulphide in the form of a solid phosphorus compound which will produce phosphorus or reduced phosphorus compounds when heated in a neutral atmosphere, in which case the process comprises heating an intimate mixture of this compound and zinc sulphide, both in a finely divided state. Suitable compounds are, for example, some phosphides, particularly zinc phosphide, $Zn_3P_2$, phosphorus pentasulphide, $P_2S_5$, and some hypophosphites.

The luminescence exhibited by the products obtained by this method, when excited by ultraviolet radiation of wavelength 3650 Å., ranges in color from pale blue or bluish-white through white and yellowish-white to yellow, the variations in color given by different products being influenced to some extent by the amount of phosphorus added, the form in which it is added, and the atmosphere employed. Thus, the color of the luminescence changes in the direction from blue to yellow with increasing proportions of phosphorus added to the zinc sulphide and to produce a given desired white or yellowish color the proportion of red phosphorus required appears to be less than the proportion of, for example, zinc phosphide required.

Moreover we have found that, in order to obtain a given desired white or yellow color of luminescence, it is necessary to add a greater proportion of phosphorus to the zinc sulphide when the process is carried out in a non-reducing, nonoxidizing atmosphere than is the case when a reducing atmosphere is employed. It is believed that only phosphorus which is present in a reduced condition is effective in activating the zinc sulphide and that heating in a neutral atmosphere produces less phosphorus in this condition, so that to obtain the same amount of effective activator a higher proportion of phosphorus is required when the heating is in a neutral atmosphere than when the heating is in a reducing atmosphere. Thus, in the method involving a neutral atmosphere, proportions of phosphorus ranging from about 0.25 per cent to about 10 per cent by weight of the weight of zinc sulphide may be used. It is not practicable to add a higher proportion of phosphorus than 10 per cent, since with greater concentrations of phosphorus a marked diminution in the brightness of the luminescence occurs.

The effect of the various factors mentioned on the color of the luminescence will be illustrated more clearly in the specific examples given below.

A suitable flux, for example a mixture of magnesium chloride and sodium chloride, may be employed if desired. The materials used should all be in the purest form obtainable. Thus, the zinc sulphide used is preferably prepared by a precipitation method, and the phosphorus or phosphorus compound employed, as well as the flux, if used, should also be as pure as possible.

In each of the following examples, the luminescent color mentioned is that of the fluorescence produced under excitation by ultraviolet radiation of wavelength 3650 Å.

Example VII 50 grams of precipitated ZnS are mixed with aqueous solutions of magnesium chloride and sodium chloride, in sufficient amounts to give a paste containing 10 per cent by weight of $MgCl_2$ and 3 per cent by weight of NaCl. The paste is dried at 160° C. and then ground with 0.5 gram of $Zn_3P_2$.

The mixture thus produced is placed in a silica boat, and is heated for one hour at 950° C. in a slow stream of nitrogen which is of commercial "oxygen free" grade and which has been dried by being bubbled through concentrated sulphuric acid. The product is allowed to cool in an atmosphere of nitrogen, and is then washed with water, dried and sieved.

The powder thus obtained shows a white-blue fluorescence.

Example VIII

The method is carried out as described in Example VII, except that the zinc phosphide is replaced by 0.125 gram of red phosphorus.

The product shows a white-blue fluorescence similar to that shown by the product of Example VII.

Example IX

The method is carried out as described in Example VII, but the zinc phosphide is replaced by 1 gram of red phosphorus.

The product shows a yellow fluorescence.

Example X 50 grams of precipitated ZnS are mixed into a paste with 10 ml. of 50 per cent $MgCl_2$ solution and 5 ml. of 30 per cent NaCl solution, and the paste is dried at 160° C. and ground with 2 grams of red phosphorus.

The mixture is heated for one hour at 950° C. in an atmosphere of sulphur vapor. The product is allowed to cool and is then washed, dried and sieved.

The resulting powder shows a yellowish-white fluorescence.

Example XI

The method is carried out as described in Example X but the amount of red phosphorus used is increased to 5 grams.

The product shows a yellow fluorescence.

We have also found that novel luminescent materials exhibiting luminescence of colors which differ in a corresponding manner from those shown by zinc sulphide without phosphorus can also be obtained by replacing a part of the sulphur content of the phosphorus-activated zinc sulphide materials described above by selenium and/or tellurium.

According to a modification, therefore, the luminescent materials comprising zinc, sulphur and phosphorus, described hereinbefore, are modified by the replacement of a part of the sulphur content by selenium and/or tellurium.

By the use of the term "replacement" in the above statement it will be understood that atoms of sulphur in the crystal structure of the matrix are replaced by atoms of selenium and/or tellurium, so that the resulting material comprises a matrix consisting of atoms of zinc and sulphur together with atoms of selenium and/or tellurium. The luminescent materials according to the invention may thus be regarded as comprising a matrix of zinc seleno-sulphide or zinc telluro-sulphide or zinc seleno-telluro-sulphide, with phosphorus as an activator.

Luminescent materials consisting of zinc seleno-sulphide and zinc telluro-sulphide are, of course, known per se, and this modification may be regarded as the introduction of phosphorus into these known materials, producing a shift toward the red end of the spectrum in the color of their luminescence.

The amount of selenium and/or tellurium introduced into the material should not be so great as to affect appreciably the body color of the product. Thus, preferably not more than 20 per cent, by weight, of the sulphur in the zinc sulphide is replaced by selenium and/or tellurium. Considerably smaller amounts, say about 0.01 per cent, of selenium and/or tellurium may be employed.

A method of manufacturing the modified luminescent material according to the invention comprises heating in a suitable atmosphere a material or mixture containing zinc, sulphur, selenium and/or tellurium, and phosphorus and consisting of one or more of these elements and/or one or more compounds of these elements.

In the preferred method of manufacturing the modified luminescent material in accordance with the invention, zinc sulphide is heated at an elevated temperature with selenium and/or tellurium in the form of either the element or of one or more suitable compounds and with an amount of phosphorus or of one or more compounds of phosphorus such that the weight of phosphorus present does not exceed 10 per cent of the combined weights of zinc sulphide and selenium and/or tellurium, the heating being carried out preferably at a temperature within the approximate range of 700° C. to 1200° C., and preferably in a reducing atmosphere such as hydrogen.

The selenium and/or tellurium may be introduced into the material to be heated in any convenient form, for example as the dioxide, $SeO_2$ or $TeO_2$, or selenious or tellurous acid, $H_2SeO_3$ or $H_2TeO_3$, or as the free element or as zinc selenide or telluride, $ZnSe$ or $ZnTe$. It is preferred to use the dioxides since they are more readily obtainable in a pure state than are the elements or most other compounds which could be used.

The modified luminescent materials according to the invention are preferably produced by heating, preferably in hydrogen, an intimate mixture of finely divided zinc sulphide and finely divided selenium dioxide and/or tellurium dioxide, in the desired proportions, either in contact with phosphorus vapor or in admixture with red phosphorus or one or more suitable solid compounds of phosphorus, also in a finely divided state. Suitable compounds of phosphorus are, for example, some phosphides, particularly zinc phosphide, $Zn_3P_2$, and oxysalts, especially phosphates such as diammonium hydrogen phosphate and calcium hydrogen phosphate or calcium orthophosphate, the preferred phosphate being diammonium hydrogen phosphate. If compounds which leave a non-volatile residue after heating are used, such as the calcium phosphates mentioned above or metallic phosphides other than zinc phosphide, the quantities used must, for obtaining the best results, not be so great that the dilution of the luminescent material by the non-luminescent residue is sufficient to cause an appreciable diminution in the brightness of the luminescence. Moreover, the said compounds must be so selected that the non-volatile residue has no appreciable deleterious effect on the phosphor in other respects. Also, the compound used must not be such as to produce a different activation of the zinc sulphide from that produced by phosphorus; for example, copper compounds must not be used. Moreover, compounds of metals which have an inhibiting effect on the luminescence, such as iron, nickel and cobalt, must be excluded.

The modified luminescent materials according to the invention may be excited to luminescence by ultraviolet radiation of long or short wavelength or by cathode rays or by X-rays, or by two or more of these agents, the color and intensity of the luminescene varying somewhat with different exciting agents. The color of the luminescence under any particular excitation depends partly upon the proportion of selenium and/or tellurium present, and is of course also influenced by the proportion of phosphorus present in the material.

The proportions of phosphorus which may be employed in the manufacture of the modified luminescent materials according to the invention should preferably not exceed about 10 per cent by weight of the weight of zinc seleno-sulphide and/or zinc telluro-sulphide. In our experience the presence of an appreciably higher proportion of phosphorus than 10 per cent results in a diminution of the brightness of the luminescence. Considerably smaller proportions of phosphorus, down to 0.1 per cent or less, for example 0.02 per cent, are effective.

A suitable flux, for example a mixture of magnesium chloride and sodium chloride, may be employed, if desired, in known manner in the manufacture of the luminescent materials.

Preferably, the materials used in the production of the luminescent materials should all be in the purest form obtainable, as is usual in the art of manufacture of luminescent materials. The zinc sulphide used is preferably prepared by a precipitation method. Selenium dioxide of the required degree of purity is obtained by adding selenium slowly to concentrated nitric acid, gently heating the mixture until all the selenium has dissolved and the evolution of oxides of nitrogen has ceased, and continuing the heating until selenium dioxide separates as a white precipitate, which is then filtered, washed, dried and ground to a powder. Tellurium dioxide may be prepared in a similar manner from tellurium and nitric acid.

A modified luminescent material according to the invention, described by way of example, may be prepared as follows:

*Example XII*

25 grams of precipitated zinc sulphide, ZnS, are mixed into a paste with 0.5 gram of diammonium hydrogen phosphate, $(NH_4)_2HPO_4$, 5 mls. of a 50 per cent aqueous solution of magnesium chloride and 2.5 mls. of a 30 per cent aqueous solution of sodium chloride. This paste is dried at 160° C. and then ground with 0.25 gram of selenium dioxide which has been prepared in the manner described above.

The mixture is placed in a silica tube and is heated in a stream of hydrogen for half an hour at 950° C. and is then allowed to cool to room temperature in an atmosphere of hydrogen. When cool, the resulting powder is washed with water, dried and sieved.

The product exhibits a yellow-white fluorescence under excitation by ultraviolet radiation of wavelength 3650 Å.

The above-described method (Example XII) may be employed in the manufacture of a zinc-tellura-sulphide or a zinc seleno-telluro-sulphide activated with phosphorus, by replacing the selenium dioxide wholly or partly with tellurium dioxide.

What we claim as new and desire to secure by Letters Patent of the United States is:

1. A luminescent material comprising a matrix consisting essentially of material of the group consisting of zinc sulphide alone and zinc sulphide having up to about 20 per cent by weight of the sulphur therein replaced by material of the group consisting of selenium and tellurium and mixtures thereof, and an activating proportion of phosphorus amounting to about .02 to 10 per cent by weight of the matrix.

2. A luminescent material comprising a matrix consisting essentially of material of the group consisting of zinc sulphide alone and zinc sulphide having up to about 20 per cent by weight of the sulphur therein replaced by material of the group consisting of selenium and tellurium and mixtures thereof, and phosphorus activator in an amount between about 0.02 to 10 per cent by weight of the matrix.

3. A luminescent material consisting essentially of a matrix of zinc sulphide and an activating proportion of phosphorus amounting to about .02 to 10 per cent by weight of the zinc sulphide matrix.

4. A luminescent material consisting essentially of a matrix of zinc sulphide having up to about 20 per cent by weight of the sulphur therein replaced by material of the group consisting of selenium and tellurium and mixtures thereof, and an activating proportion of phosphorus amounting to about .02 to 10 per cent by weight of the matrix.

5. A luminescent material consisting essentially of a matrix of zinc sulphide having up to about 20 per cent by weight of the sulphur therein replaced by selenium, and an activating proportion of phosphorus amounting to about .02 to 10 per cent by weight of the matrix.

6. A luminescent material consisting essentially of a matrix of zinc sulphide having up to about 20 per cent by weight of the sulphur therein replaced by tellurium, and an activating proportion of phosphorus amounting to about .02 to 10 per cent by weight of the matrix.

7. The method of producing luminescent materials which comprises preparing a matrix component of the group consisting of zinc sulphide alone and zinc sulphide admixed with compound of material of the group consisting of selenium and tellurium and mixtures thereof in amount sufficient to replace up to about 20 per cent of the sulphur in said zinc sulphide with said material of the group consisting of selenium and tellurium and mixtures thereof, and firing said matrix component in the presence of an activating proportion of phosphorus in the form of material of the group consisting of elemental phosphorus and compounds of phosphorus which will produce phosphorus or reduced phosphorus compounds when heated in a nonoxidizing atmosphere and sufficient in amount to constitute about .02 to 10 per cent by weight of the matrix, the firing being performed in a nonoxidizing atmosphere at a temperature in the range of about 700–1200° C.

8. The method as set forth in claim 7 wherein the firing is performed in a reducing atmosphere.

9. The method of producing a luminescent material which comprises heating in a reducing atmosphere and to a temperature of approximately 900–1100° C., a mixture of zinc sulphide with an activating proportion of red phosphorus amounting to about .02 to 10 per cent by weight of the zinc sulphide matrix.

10. The method of producing a luminescent material which comprises heating in a reducing atmosphere and to a temperature of approximately 900–1100° C., a mixture of zinc sulphide with an activating proportion of zinc phosphide sufficient to provide phosphorus in an amount between about .02 and 10 per cent by weight of the zinc sulphide matrix.

11. The method of producing a luminescent material which comprises heating in a reducing atmosphere and to a temperature of approximately 900–1100° C., a mixture of zinc sulphide with an activating proportion of a phosphate sufficient to provide phosphorus in an amount between about .02 and 10 per cent by weight of the zinc sulphide matrix.

12. The method of producing luminescent materials which comprises firing at a temperature in the range of about 700–1200° C. in a reducing atmosphere an intimate mixture of finely divided zinc sulphide and finely divided dioxide of material of the group consisting of selenium and tellurium and mixtures thereof and an activating proportion of phosphorus in the form of material of the group consisting of elemental phosphorus and compounds thereof, the said dioxide being present in an amount up to about 20 per cent by weight of the sulphur in said zinc sulphide and the phosphorus amounting to about .02 to 10 per cent by weight of the matrix.

ALFRED H. McKEAG.
PETER W. RANBY.

REFERENCES CITED

The following references are of record in the file of this patent:

J. Electrochemical Society, vol. 96, Aug. 1949, pp. 85–89.